United States Patent Office 3,357,050
Patented Dec. 12, 1967

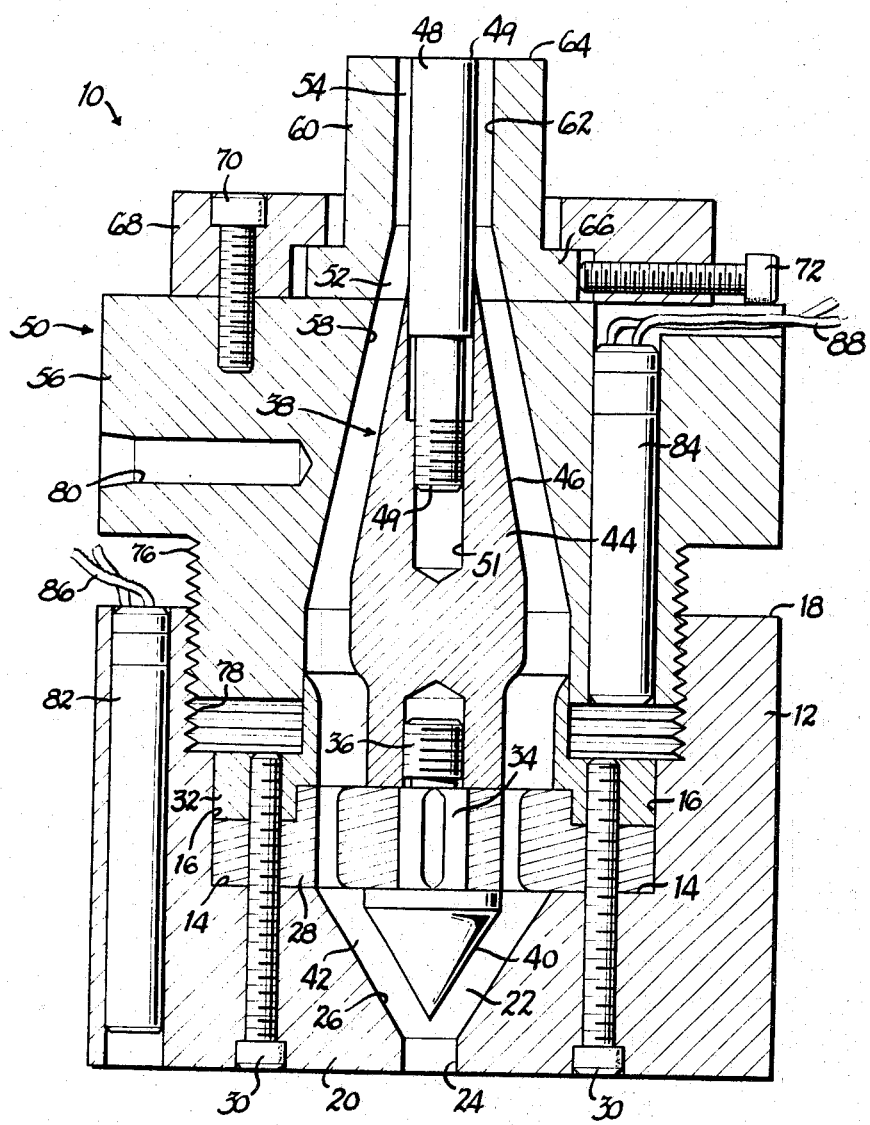

3,357,050
APPARATUS FOR EXTRUDING PLASTICIZED MATERIAL
Donald H. Criss, Toledo, Ohio, assignor to Owens-Illinois, Inc., a corporation of Ohio
Filed Mar. 11, 1966, Ser. No. 533,648
7 Claims. (Cl. 18—14)

ABSTRACT OF THE DISCLOSURE

An orifice structure is provided which includes relatively movable valving portions which are adjusted to vary a pressure drop interposed between a source of plasticized material and an outlet orifice. The orifice structure includes an orifice block and a mandrel within the orifice block provided with complementary tapered surfaces, the orifice block being adjustable to relatively move the tapered surfaces toward or away from each other, thus changing the cross sectional area of the flow path between the tapered surfaces. The orifice block is readily accessible and available at the outside of the orifice structure, so that the adjustment can be made without interrupting the operating cycle of the extrusion apparatus.

---

This invention relates to the plastic molding art, and more particularly to an apparatus including an orifice structure through which plasticized material is expressed in the manufacture of plastic articles, the orifice structure including valving portions which are adjustable to regulate the flow of plasticized material through the orifice structure.

In one known type of plastic molding apparatus, plasticized plastic material is accumulated in a passage or in a reciprocating screw extruder which is in free communication with an extrusion orifice. Such accumulation of the plasticized material is made possible by interposing in the flow path of the plasticized material an obstruction or restriction capable of performing a valving function, the obstruction or restriction providing a pressure drop in the path of flow of the accumulated material to the orifice of such a value that the pressure drop at the obstruction is greater than the pressure at which the material is accumulated.

It has been proposed to make the valving portion of the orifice structure adjustable such that the pressure drop interposed in the path of flow of the plasticized material may be varied and/or regulated to provide a desired pressure drop. It has also been proposed that the valving structure be adjustable in such a way that the size and shape of the outlet orifice is not changed. An orifice structure of this type is described in a copending application of James E. Heider and Donald E. Criss (the present inventor), Ser. No. 324,277, filed on Nov. 18, 1963, now Patent No. 3,256,563 and assigned to the assignee of the present application. The disclosure of that application is incorporated herein.

Difficulty has been encountered, however, in providing an adjustable valving portion in an orifice structure in such a way that an adjustment of pressure drop can be made without interfering with the operation of the extrusion apparatus.

The present invention provides an orifice structure having relatively movable valving portions, one of which is adjustable to vary a pressure drop interposed between a source of plasticized material and an outlet orifice, the adjustable valving portion being readily accessible and available at the outside of the orifice structure, so that the adjustment can be made without interrupting the operating cycle of the extrusion apparatus.

In a preferred embodiment of the invention, the orifice structure includes an orifice block having a passage extending through it, a mandrel supported in the passage, and a mounting structure for supporting the orifice block for telescopic movement relative to the mandrel. The orifice block and the mandrel are provided with complementary tapered surfaces which move toward each other or move away from each other, depending upon the direction in which the orifice block is adjusted, thus changing the cross sectional area of the flow path between the tapered surfaces.

At the outlet end of the orifice structure, a portion of the orifice block is provided with a cylindrical bore, and a portion of the mandrel has a cylindrical projection extending in the orifice bore to provide an annular outlet orifice. Neither the size nor the shape of the latter orifice is changed when the orifice block is moved relative to the mandrel to vary the pressure drop imposed by the tapered surfaces. The exterior of the orifice block is readily accessible from the outside of the orifice structure, thus allowing the adjustment to be made easily without stopping the extrusion cycle.

Accordingly, it is an object of the present invention to provide an improved orifice structure wherein a valving portion of the structure is readily accessible for adjustment during operation to vary the pressure drop imposed by the valving portion.

Another object of the present invention is to provide in an orifice structure an orifice block which has a passage therethrough with a tapered portion in which a tapered mandrel is supported, the orifice block being movable telescopically relative to the mandrel to adjust the width of a restricted gap between the tapered surfaces and thereby impose a variable pressure drop between the ends of the passage.

A further object of the invention is to provide improved supporting means which supports an exterior orifice block for telescopic movement relative to a mandrel provided therein.

Other objects of this invention will appear in the following description and appended claims, reference being had to the accompanying drawings forming a part of this specification wherein like reference characters designate corresponding parts in the several views.

On the drawing:

The single figure of the drawing is a vertical sectional view of an orifice structure which performs a valving function, the orifice structure being in accordance with the preferred embodiment of the invention.

Before explaining the present invention in detail, it is to be understood that the invention is not limited in its application to the details of construction and arrangement of parts illustrated in the accompanying drawing, since the invention is capable of other embodiments and of being practiced or carried out in various ways. Also, it is to be understood that the phraseology or terminology employed herein is for the purpose of description and not of limitation.

As shown on the drawing:

The orifice structure 10 of the invention includes a base support 12 on which the working portions of the orifice structure are supported. The base support 12 is a generally cup-shaped member having an interior bottom surface 14 and an interior side surface 16, both of these surfaces being recessed relative to the top 18 of the base support. The bottom wall 20 of the base support has an opening 22 extending through it which is bounded by a cylindrical surface 24 and a tapered surface 26, thus providing an inlet opening leading into the interior of the base support 12.

Resting on the interior surface 14 of the base support 12 is a spider member 28 which is affixed at the periphery thereof to the base support 12 by means of cap screws 30. The cap screws also extend into a ring member 32 and draw it downward against the top of the spider 28, thus clamping the spider firmly onto the seat provided by the bottom surface 14 on the interior of the base support. At the center of the spider there is a hub 34 having a threaded member 36 attached to it and extending upward into a mandrel assembly 38. The threaded member 36 fastens the mandrel assembly to the hub 34 of the spider 28. Projecting from the bottom of the spider is a conical projection 40 which extends into the tapered portion of the opening 22 formed through the bottom wall 20 of the base support 12. A fixed gap 42 is defined between the exterior surface of the projection 40 and the tapered surface 26 of the bottom wall 20.

The mandrel assembly 38 includes a body member 44 having a tapered surface 46, and a cylindrical rod 48 which has a threaded stud 49 at one end which is screwed into a tapped bore 51 in the mandrel body 44. The mandrel assembly is supported in a concentric position inside the annular surface 16 of the base support 12.

Surrounding the mandrel assembly 38 there is an orifice block assembly 50 through which a passage 52 extends from the inlet opening 22 to an outlet orifice 54 about the cylindrical rod 48. The orifice block assembly 50 includes a hollow block member 56 having an interior tapering surface 58 confronting and complementary with the tapering surface 46 of the mandrel assembly 44. Surfaces 46 and 58 define a tapered annular gap between them which is interposed in the passage 52 leading through the entire orifice structure. The orifice block assembly 50 also includes an annular cylindrical member 60 having a cylindrical bore 62 therein in which the rod 48 of the mandrel assembly extends to a point where the end 49 of the rod 48 is flush with the end 64 of annular member 60. The annular member 60 has a flange 66 at the bottom end thereof, and a portion of a clamp member 68 overlaps the flange 66 such that the annular member 60 may be clamped onto the top of the orifice block member 56 by the clamp member 68. The clamp member 68 is drawn down against the top of orifice block 56 by means of cap screws 70, and there is another cap screw 72, the end of which abuts against a flat surface on the flange 66 of member 60 to hold that member against rotation.

A recessed portion 76 of block member 56 at its bottom end is exteriorly threaded to be screwed into matching threads 78 on the interior of the top portion of the base support 12. Thus, the base support 12 supports the whole orifice block assembly 50 for axial and telescopic movement relative to the mandrel assembly 38, and this movement is accomplished by rotating the orifice block 50 relative to the base support 12. The threads 76 and 78 on members 56 and 12 are such that, as viewed from the top of the orifice structure, clockwise rotation of the member 56 maves tapered surface 58 toward tapered surface 46, and counterclockwise rotation of the member 56 moves tapered surface 58 away from tapered surface 46.

Thus, the telescopic movement of the orifice block assembly 50 relative to the mandrel assembly 38 varies the width of the gap between these two assemblies to thereby impose a variable pressure drop on material flowing through the passage 52 which extends through the orifice structure. It is to be noted, however, that the movement of the tapered surfaces does not change the size nor the shape of the outlet orifice 54, so the adjustment can be made without interrupting the extrusion or expression of material out through the outlet orifice 54.

The orifice block member 56 is readily accessible at the side of the orifice structure, and so it is a simple matter to adjust the orifice block assembly by rotating it. For this purpose, a bore 80 is provided in the orifice block 56 to receive a tool by which force may be applied to rotate the orifice block 56. After the orifice block assembly has been adjusted, its end 64 may no longer be flush with the end 49 of the rod 48. If plasticized material is issued through orifice 54 by extrusion, an uneven condition of these end surfaces can be tolerated. However, the ends of members 60 and 48 should be even or flush if material is being injected through orifice 54 into a mold. The end surfaces may be evened by rotating the rod 48 to screw threaded member 49 in or out of tapped bore 51, as required, thus axially moving rod 48 to even its end surface 49 with end surface 64 of the member 60.

The plasticized material which flows through the orifice structure should remain at or near the temperature at which it leaves an extruder which communicates with the passage through the orifice block. In order to keep the orifice structure up to this temperature, cartridge heaters 82 and 84 are mounted respectively in the base support 12 and the orifice block member 56. These heaters are connected by appropriate wiring 86 and 88 to energizing circuits.

The invention thus provides an orifice structure by which the flow of plasticized material through an orifice may be regulated by adjustment of a valving portion which is readily accessible at the side of the orifice structure. The orifice structure may be in use for extruding plasticized material at the time the adjustment is made; no interruption of the extrusion process is required.

I claim:

1. In an apparatus for extruding plasticized plastic material, an orifice structure capable of performing a valving function comprising a mandrel having a tapered surface between opposite ends thereof, an annular assembly surrounding said mandrel and defining therewith an annular passage extending through said annular assembly, said annular assembly including a support base having an inlet orifice bore therein at one end of said passage, means at the other end of said passage having an outlet orifice bore therein, means affixing said mandrel to said support base with said mandrel axially aligned with said inlet and outlet bores, and an annular orifice block surrounding said tapered surface of said mandrel and having a similarly tapered interior surface cooperating therewith to define a tapered gap portion of said passage between said inlet and outlet orifice bores, said orifice block threadedly engaging said support base and being axially movable upon rotation of said orifice block relative to said support base such that rotation of said orifice block in one direction relatively moves said tapered surfaces toward each other and rotation of said orifice block in the opposite direction relatively moves said tapered surfaces away from each other, said tapered surfaces thereby providing a variable pressure drop between the ends of said passage to regulate the flow of plasticized material through said passage.

2. The orifice structure of claim 1 wherein said outlet orifice bore is cylindrical and said mandrel has a cylindrical projection extending into said outlet orifice bore providing an annular orifice.

3. The orifice structure of claim 2 wherein said outlet orifice bore means is movable axially with said orifice block without changing the size or shape of said outlet orifice.

4. The orifice structure of claim 3 wherein said cylindrical projection of said mandrel is supported for axial adjustment relative to said tapered portion of said mandrel and relative to said cylindrical outlet orifice bore.

5. In an apparatus for extruding plasticized plastic material, the improvement of an extrusion orifice structure capable of performing a valving function by manipulation of an adjustment portion accessible at the outside of said orifice structure, said orifice structure comprising an orifice block assembly having a passage therethrough communicating at one end with a source of plasticized material, said orifice block assembly including an end portion at the other end of said passage having a cylindrical orifice bore therein terminating said passage, and further including a medial portion of different cross section than said orifice bore and a tapered portion merging into said medial portion and said end portion, respectively, at opposite ends thereof, a mandrel assembly concentrically disposed in said passage, means for supporting said mandrel assembly, and means supporting said orifice block assembly for telescopic movement relative to said mandrel assembly, said orifice block assembly having an external portion disposed laterally of said passage available for adjustment to move said orifice block assembly telescopically relative to said mandrel assembly, said mandrel assembly including a terminal cylindrical projection extending into said cylindrical orifice bore to define an annular outlet orifice and a tapered valving portion cooperable with the tapered valving portion of said orifice block assembly to define a restricted material flow path therebetween, said flow path being interposed between the ends of said passage and of a cross sectional area which is variable as said orifice block assembly is moved relative to said mandrel assembly, the valving portions of said mandrel assembly and said orifice block assembly imposing a variable pressure drop between said source and said outlet orifice, but without varying the size or shape of the outlet orifice.

6. The orifice structure of claim 5 wherein said supporting means for said orifice block assembly comprises an annular structure having an extension of said passage therethrough, said annular structure having a threaded surface engaging a threaded surface of said orifice block assembly providing for said telescopic movement of said orifice block assembly upon rotation thereof relative to said annular structure.

7. The orifice structure of claim 6 wherein said supporting means for said mandrel assembly comprises an apertured member spanning the space between said annular structure and said mandrel assembly, said apertured member being affixed peripherally thereof to said annular structure and being affixed centrally thereof to said mandrel assembly.

References Cited

UNITED STATES PATENTS

| | | | |
|---|---|---|---|
| 2,057,467 | 10/1936 | Williams | 18—14 |
| 3,018,516 | 1/1962 | Clinefelter | 18—14 |
| 3,146,495 | 9/1964 | Sanford | 18—14 |
| 3,281,896 | 11/1966 | Meyer et al. | 18— 5 X |

OTHER REFERENCES

German patent application No. 1,209,281, (Nossol) January 1966.

WILLIAM J. STEPHENSON, *Primary Examiner.*